United States Patent [19]
Huckins

[11] Patent Number: 5,890,162
[45] Date of Patent: Mar. 30, 1999

[54] REMOTE STREAMING OF SEMANTICS FOR VARIED MULTIMEDIA OUTPUT

[75] Inventor: Jeffrey L. Huckins, Beaverton, Oreg.

[73] Assignee: Intel Corporation, Santa Clara, Calif.

[21] Appl. No.: 767,357

[22] Filed: Dec. 18, 1996

[51] Int. Cl.⁶ .............................................. G06F 15/173
[52] U.S. Cl. ............................ 707/104; 707/3; 707/10; 395/200.33; 395/200.38; 395/200.47; 395/200.61
[58] Field of Search ............................... 707/104, 10, 3; 395/200.33, 200.47, 200.38, 200.61

[56] References Cited

U.S. PATENT DOCUMENTS

| | | | |
|---|---|---|---|
| 5,537,408 | 7/1996 | Branstad et al. ..................... | 370/473 |
| 5,602,992 | 2/1997 | Danneels ............................ | 395/200.78 |
| 5,630,067 | 5/1997 | Kindell et al. ..................... | 395/200.61 |
| 5,737,495 | 4/1998 | Adams et al. ....................... | 707/104 |
| 5,761,416 | 6/1998 | Mandal et al. ...................... | 395/200.8 |

*Primary Examiner*—Thomas G. Black
*Assistant Examiner*—Jean R. Homere
*Attorney, Agent, or Firm*—Kenyon & Kenyon

[57] ABSTRACT

An apparatus and method creates remote multimedia outputs on client computers. The client computers receive a stream of semantics from a server computer. For each semantic received, the client computers identify a multimedia data object that corresponds to the received semantic. The multimedia data object has previously been locally stored at each client computer. Finally, the client computers process the identified multimedia data object in accordance with the semantic to create a multimedia output on each client computer's output device.

15 Claims, 3 Drawing Sheets

CLIENT 20

| DATA OBJECT IDENTIFIER: | DATA OBJECT: |
|---|---|
| X | DOG |
| Y | G-RATED VIDEO |
| Z | ROCK MUSIC |

100

CLIENT 30

| DATA OBJECT IDENTIFIER: | DATA OBJECT: |
|---|---|
| X | CAT |
| Y | R-RATED VIDEO |
| Z | COUNTRY MUSIC |

200

CLIENT 40

| DATA OBJECT IDENTIFIER: | DATA OBJECT: |
|---|---|
| X | RABBIT |
| Y | X-RATED VIDEO |
| Z | RAP MUSIC |

REMOTE STREAMING OF SEMANTICS FOR VARIED MULTIMEDIA OUTPUT

BACKGROUND OF THE INVENTION

The present invention is directed to a method and apparatus for streaming semantics from a server to a plurality of client computers. More particularly, the resent invention is directed to a method and apparatus for streaming semantics from a server to a plurality of client computers which results in a multimedia output at the client computers that can vary in content among the client computers.

Streaming multimedia data from a server computer to a client computer is a known way to create a multimedia output at a client computer. Multimedia data includes audio, textual, and graphical (including video) data. Streaming data involves sending a continuous transmission of data from the server to the client. At the client computer, received data is buffered in a cache memory and continuously processed as soon as, or soon after, being received by the client. The client computer processes the data by creating a multimedia output from the received multimedia data. The advantage of streaming is that the client computer does not have to wait until all data is downloaded from the server before some of the data is processed and the multimedia output is created.

An example of multimedia data streaming is found in the RealAudio® audio player that is available over the Internet at Universal Resource Locator ("URL") http://www.realaudio.com. RealAudio® continuously sends audio data over the Internet from a server computer to client computers. The audio data is buffered and processed by the client computers while the data is being sent. The client computer processes the data by creating an audio output from the audio data.

One problem with existing methods of creating remote multimedia outputs at client computers using streaming of multimedia data is that multimedia data, especially audio and graphical data, requires a large amount of data for a desired output. For example, five minutes of uncompressed audio output at a client computer requires streaming approximately 4.7 megabytes of data. Streaming five minutes of video output, which includes both graphical, audio and textual data, would require even more data. Therefore, a large bandwidth is required to send multimedia data from a server to a client. Without the availability of a large bandwidth, the transmission of the data is delayed, and the streaming of the data in "real time" will not occur because the client computer will process data much faster than it receives it.

A second problem with existing methods of creating remote multimedia outputs at client computers using streaming of multimedia data is that when multiple client computers process a single set of data streamed from a server computer, the resultant multimedia output at each client computer is identical. For example, if an animated sequence is sent from a server computer to client computers, the display of the animated sequence at all client computers is identical. However, it may be desirable for the display of the animated sequence to be tailored for different client computers. For example, it may be desirable for one client computer to display an animated sequence using dogs as characters in the sequence, and another client computer to display an animated sequence using cats. Using existing methods of streaming multimedia data, this option is not available.

Based on the foregoing, there is a need for a method and apparatus for creating a multimedia output at client computers using information streamed from a server computer that uses less bandwidth than existing methods, and for enabling multiple client computers to create different multimedia outputs using the same received information from the client computer.

SUMMARY OF THE INVENTION

One embodiment of the present invention is an apparatus and method for creating remote multimedia outputs on client computers. The client computers receive a stream of semantics from a server computer. For each semantic received, the client computers identify a multimedia data object that corresponds to the received semantic. The multimedia data object has previously been locally stored at each client computer. Finally, the client computers process the identified multimedia data object in accordance with the semantic to create a multimedia output on each client computer's output device.

BRIEF DESCRIPTION OF THE DRAWINGS

FIG. 3 is a diagram of object identifier look-up tables stored in client computers in accordance with an embodiment of the present invention.

DETAILED DESCRIPTION

Figure 1:
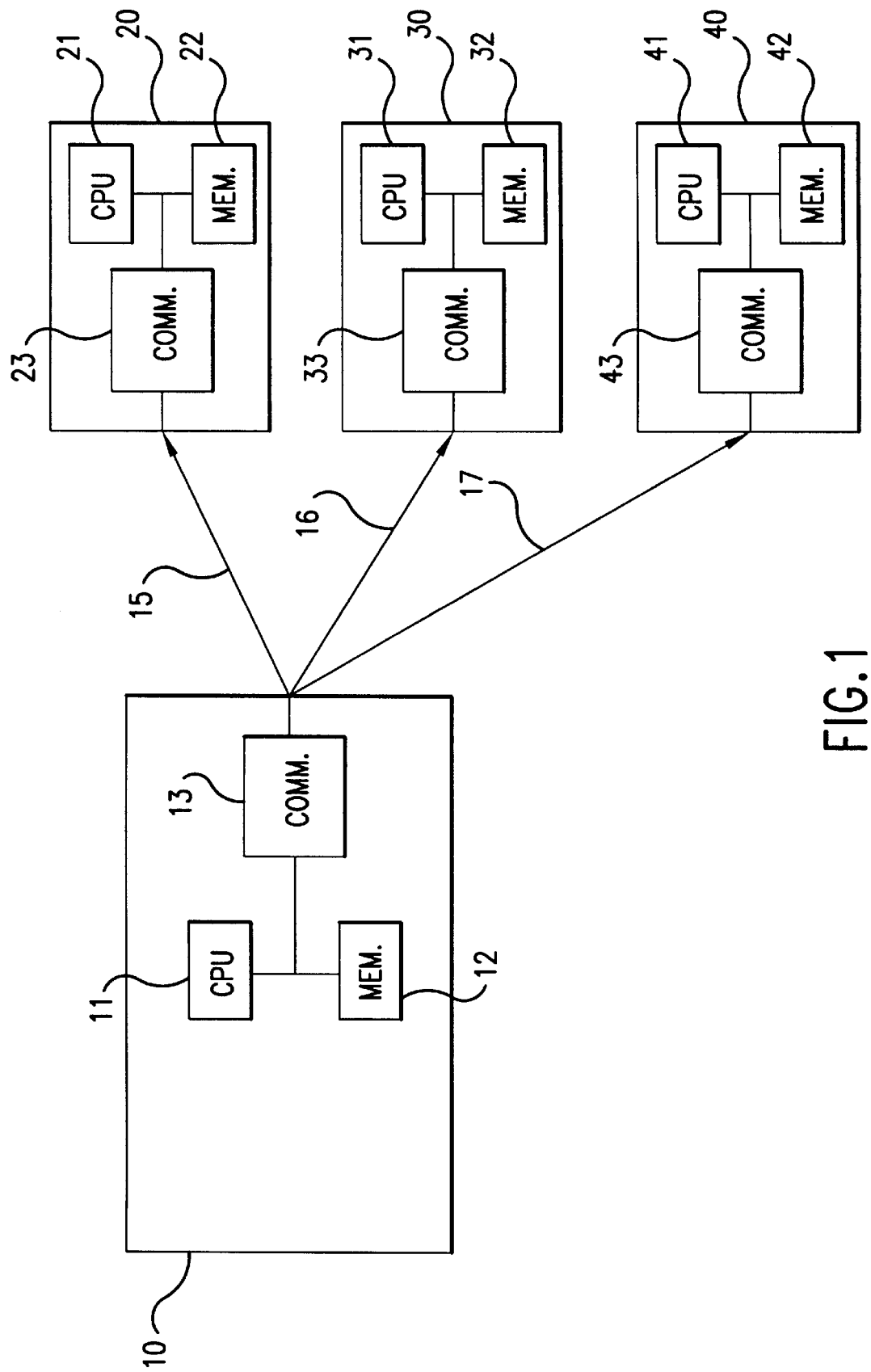
FIG. 1 is a block diagram of computer hardware devices in accordance with an embodiment of the present invention.

Referring to FIG. 1, a block diagram illustrating computer hardware devices used to implement an embodiment of the present invention. An embodiment of the present invention includes a server computer and at least one remote computer, referred to as a "client" computer. FIG. 1 illustrates server computer 10 and three client computers 20, 30 and 40. Server 10 and client computers 20, 30, and 40 are general purpose computers known in the art.

Server computer 10 includes a central processing unit ("CPU") 11, a memory device 12 and a communication device 13. CPU 11 executes programs stored in memory device 12. Communication device 13 allows server 10 to communicate with clients 20, 30 and 40.

Client computer 20, like server 10, includes a CPU 21, a memory device 22, and a communication device 23.

Communication device 23 allows client 20 to communicate with server 10.

Similarly, client computer 30 includes a CPU 31, a memory device 32, and a communication device 33, and client computer 40 includes a CPU 41, a memory device 42, and a communication device 43.

Clients 20, 30 and 40 each include output devices (not shown) for outputting multimedia data. For example, the clients include monitors for outputting graphical and textual data, and speakers for outputting audio data.

Server 10 communicates with clients 20, 30 and 40 via communication lines 15, 16 and 17, respectively. Communication lines 15, 16 and 17 may represent wireless communication, communication using the Internet, communication using a local area network, or any other method that allows server 10 to send data to clients 20, 30 and 40. In one embodiment, the data sent to clients 20, 30 and 40 from server 10 is in the form of a data packet.

Figure 2:
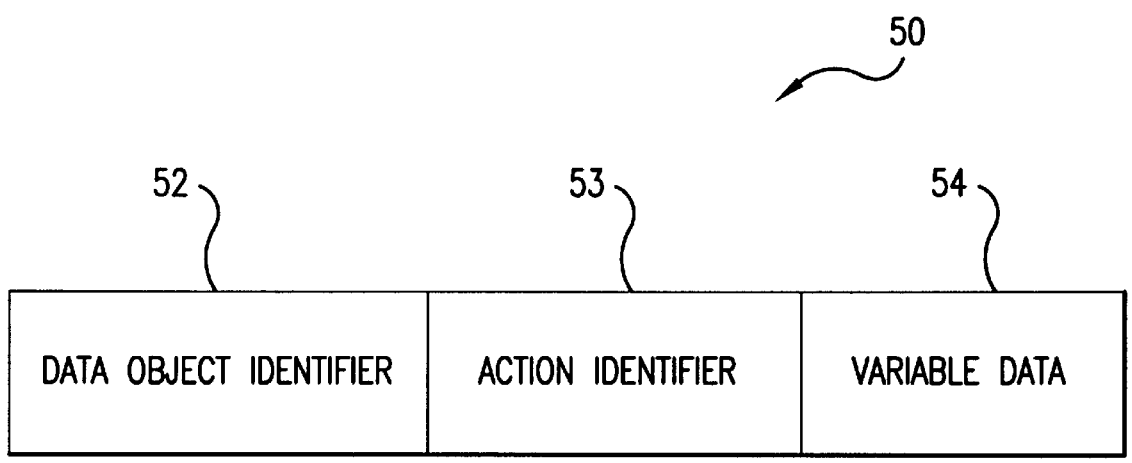
FIG. 2 is diagram of a data packet generated by a server computer in accordance with an embodiment of the present invention.

FIG. 2 illustrates the structure of each data packet sent from server 10 to clients 20, 30 and 40 in one embodiment of the invention. Data packet 50 is generated by CPU 11 in client 20. Data packet 50 is a semantic. A semantic instructs a computer to perform a specific sequence of actions. Data packet 50 is received by clients 20, 30 and 40, and processed by their corresponding CPUs 21, 31 and 41, respectively. Each client 20, 30 and 40 receives identical copies of data packet 50. Streaming of data from server 10 to clients 20, 30 and 40 occurs when multiple data packets 50 are continuously sent to the clients from server 10 and the clients process data packets while additional data packets are being sent.

Data packet 50 includes a data object identifier 52 segment, an action identifier 53 segment, and a variable data 54 segment. Data object identifier 52 is an identifier corresponding to multimedia data objects that are stored locally on each client that receives data packet 50. The multimedia data objects are stored local to the client computers in the storage devices before the client computers receive data packet 50. Examples of how the data objects get locally stored include distributing the data objects on a computer readable medium such as a CD-ROM to the client computers, or remotely downloading the data objects from server 10.

In one embodiment, each client stores a look-up table which references a corresponding data object for each data object identifier 52. The look-up table can be modified by the user of the client. For example, the user can assign to each data object identifier 52 a choice from a predefined set of data objects. The assignment process results in the look-up table.

Action identifier 53 specifies an action that the CPU in each client that receives data packet 50 performs on the data object corresponding to data object identifier 52. Examples of action identifier 53 include rotate, raise volume, blink, etc. CPUs 21, 31 and 41 are programmed to perform the action specified by a received action identifier 53.

Variable data 54 is an optional segment of data packet 60, and is included when a data variable is required by action identifier 53. For example, action identifier 53 may instruct the client to move the data object left ___ display units. For this action identifier 53, variable data 54 specifies the number of display units. CPUs 21, 31 and 41 are programmed to recognize when a data variable is required when processing an action identifier 53, and are programmed to use variable data 54 as the data variable.

FIG. 3 illustrates examples of object identifier look-up tables used in one embodiment of the present invention. Table 100 is stored in memory 22 of client 20, table 200 is stored in memory 32 of client 30, and table 300 is stored in memory 42 of client 40. The tables illustrated in FIG. 3 include only three data object identifiers with corresponding data objects. However, a system in accordance with the invention will typically be implemented with a much larger number of data object identifiers and corresponding data objects.

In one embodiment, each table stores a multimedia data object corresponding to a data object identifier 52 received from server 10. For example, in table 100, a graphical dog corresponds to data object identifier "X", a G-rated video (suitable for children) corresponds to data object identifier "Y", and rock music corresponds to data object identifier "Z".

Similarly, in table 200, a graphical cat corresponds to data object identifier "X", an R-rated video (suitable for children only with adult supervision) corresponds to data object identifier "Y", and country music corresponds to data object identifier "Z".

Finally, in table 300, a graphical rabbit corresponds to data object identifier "X", an X-rated video (suitable for adults only) corresponds to data object identifier "Y", and rap music corresponds to data object identifier "Z".

The CPU in each client can process the multimedia data objects in a known way to create a multimedia output. For example, when processed by a CPU, the data object of a graphical dog will create a display of a graphical dog. Likewise, when processed by a CPU, the data object of rock music will create an audio output of rock music.

In another embodiment, tables 100, 200 and 300 can provide a pointer corresponding to each data object identifier. The pointer is a memory location where a data object is locally stored and is available to the CPU to be processed.

In operation, server 10 streams semantics, or data packets 50, to clients 20, 30 and 40. The data packets are buffered by the clients in their corresponding memory devices 22, 32 and 42, and data packets are processed by CPUs 21, 31 and 41 using their corresponding look-up tables.

For example, server 10 sends a data packet 50 in which data object identifier 52="X", action identifier 53="blink for ___ seconds" and variable data 54="5". When this data packet 50 is processed by client 20 using look-up table 100, a blinking dog is displayed for 5 seconds. When processed by client 30 using look-up table 200, a blinking cat is displayed for 5 seconds. When processed by client 40 using look-up table 300, a blinking rabbit is displayed for 5 seconds.

In another example, server 10 sends a data packet 50 in which data object identifier 52="Y", action identifier 53="play for ___ minutes" and variable data 54="30". When this data packet 50 is processed by client 20 using look-up table 100, a G-rated video is played for 30 minutes. When processed by client 30 using look-up table 200, an R-rated video is played for 30 minutes. When processed by client 40 using look-up table 300, an X-rated video is played for 30 minutes.

As described, the present invention provides for creating remote multimedia output by streaming semantics from a server computer to client computers. The use of semantics instead of the actual multimedia data reduces the bandwidth required between the server and the clients. The semantics are processed and result in a multimedia output at the client computer by storing local to the client computer multimedia data that corresponds to the semantics. In addition, the present invention allows a single semantic sent to multiple client computers from the server computer to result in varied multimedia outputs on each client. The multimedia output can be tailored by the user of each client by modifying look-up tables stored in each client.

Several embodiments of the present invention are specifically illustrated and/or described herein. However, it will be appreciated that modifications and variations of the present invention are covered by the above teachings and within the purview of the appended claims without departing from the spirit and intended scope of the invention. For example, the embodiment described uses look-up tables to identify a data object corresponding to a data object identifier. However, any method that identifies a data object stored local to the client that corresponds to a data object identifier can be used in the present invention.

What is claimed is:

1. A method of creating remote multimedia output on at least one client computer, said method comprising the steps of:

a) receiving a semantic on a first client computer from a server computer;

b) identifying a first multimedia data object stored local to the first client computer, wherein the first multimedia data object corresponds to the semantic; and c) processing the first multimedia data object in accordance with the semantic to create a first multimedia output on the first client computer;

wherein the semantic comprises an action identifier segment, and step (c) comprises the step of performing an action on the first multimedia data object in accordance with the action identifier segment.

2. The method of claim 1, wherein the semantic further comprises a data object identifier segment, and said step (b) comprises the step of storing local to the first client computer a table that identifies multimedia data objects corresponding to data object identifier segments.

3. The method of claim 1, wherein the semantic further comprises a variable data segment, and said step of performing an action requires the variable data segment.

4. The method of claim 1, further comprising the steps of:

d) receiving the semantic on a second client computer from the server computer;

e) identifying a second multimedia data object stored local to the second client computer, wherein the second multimedia data object corresponds to the semantic; and f) processing the second multimedia data object in accordance with the semantic to create a second multimedia output on the second client computer.

5. The method of claim 1, wherein the first multimedia output comprises textual output, graphical output, and audio output.

6. A system that creates remote multimedia output comprising:

a first client computer comprising:

a first communication device having an input to receive a semantic;

a first output device;

a first memory device that stores a first multimedia data object that corresponds to the semantic; and a first processor coupled to said first communication device, said first memory device and said first output device, said first processor programmed, in response to said first communication device receiving the semantic, to identify said first multimedia object and process the first multimedia object to create a first multimedia output on said first output device;

wherein the semantic comprises an action identifier segment, and said first processor is programmed to process the first multimedia object by performing an action on the first multimedia data object in accordance with the action identifier segment.

7. The system of claim 6, wherein the semantic further comprises a data object identifier segment, and said memory device further stores a table that identifies multimedia data objects corresponding to data object identifier segments.

8. The system of claim 6, wherein the semantic further comprises a variable data segment, and said processor requires the variable data segment to perform an action on the first multimedia data object.

9. The system of claim 6, further comprising:

a second client computer comprising:

a second communication device having an input to receive the semantic;

a second output device;

a second memory device that stores a second multimedia data object that corresponds to the semantic; and a second processor coupled to said second communication device, said second memory device and said second output device, said second processor programmed, in response to receiving the semantic, to identify said second multimedia object, and process the second multimedia object to create a second multimedia output on said second output device.

10. The system of claim 6, further comprising:

a server computer that generates the semantic.

11. The system of claim 6, wherein the first multimedia output comprises textual output, graphical output, and audio output.

12. A computer-readable medium having stored thereon instructions which, when executed by a processor in a client computer, cause the processor to perform steps for creating remote multimedia output, said steps comprising:

a) responsive to receiving a semantic, identifying a multimedia data object stored local to the client computer, wherein the multimedia data object corresponds to the semantic; and b) processing the multimedia data object in accordance with the semantic to create a multimedia output on the client computer, wherein the semantic comprises an action identifier segment, and step (b) comprises the step of performing an action on the multimedia data object in accordance with the action identifier segment.

13. The computer-readable medium of claim 12, wherein the semantic further comprises a data object identifier segment, and said step (a) comprises the step of storing local to the client computer a table that identifies multimedia data objects corresponding to data object identifier segments.

14. The computer-readable medium of claim 12, wherein the semantic further comprises a variable data segment, and said step of performing an action requires the variable data segment.

15. The computer-readable medium of claim 12, wherein the multimedia output comprises textual output, graphical output, and audio output.

* * * * *